Feb. 27, 1923.
R. T. WING
LENS FOR HEADLIGHTS
Filed Oct. 21, 1920
1,446,607
2 sheets-sheet 1
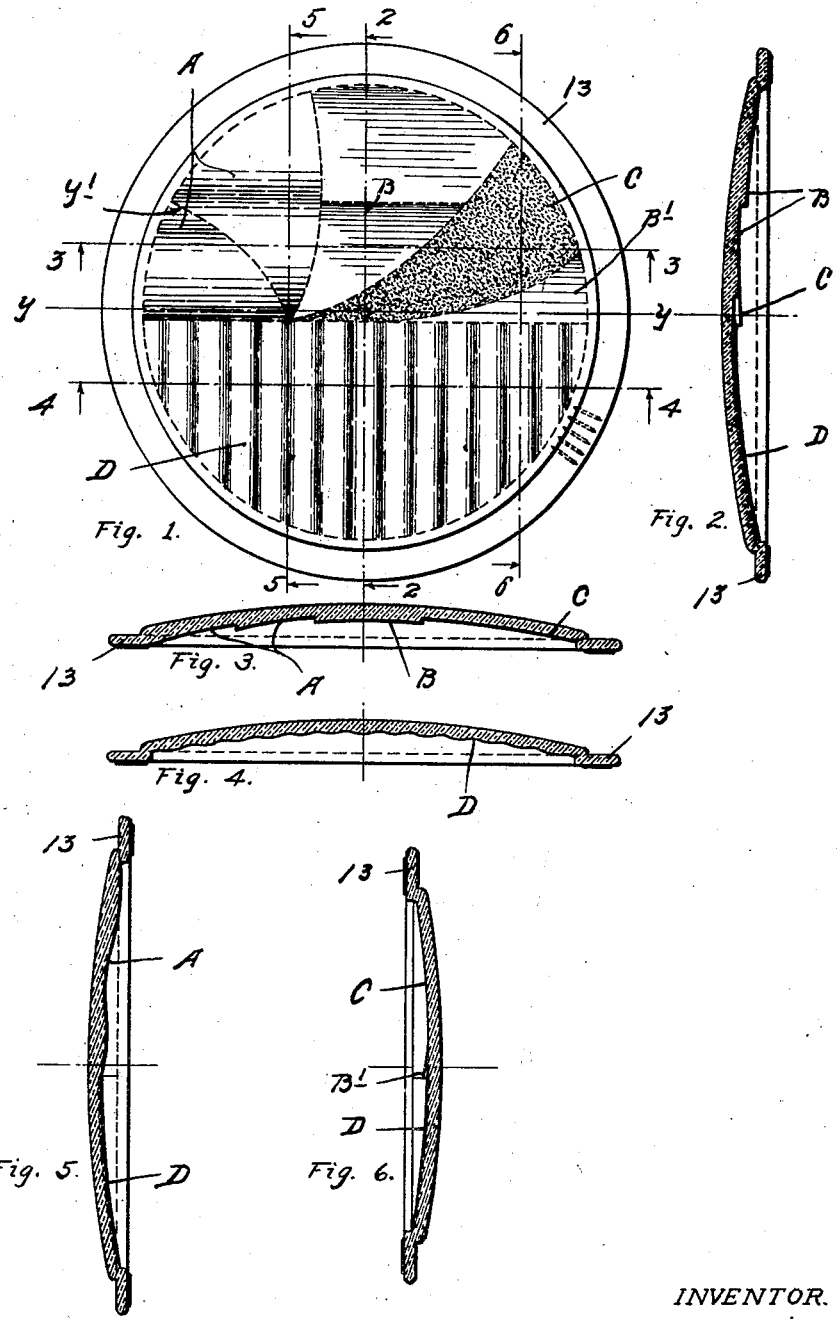
INVENTOR.
Russell T. Wing
ATTORNEY
Harry D. Kilgore

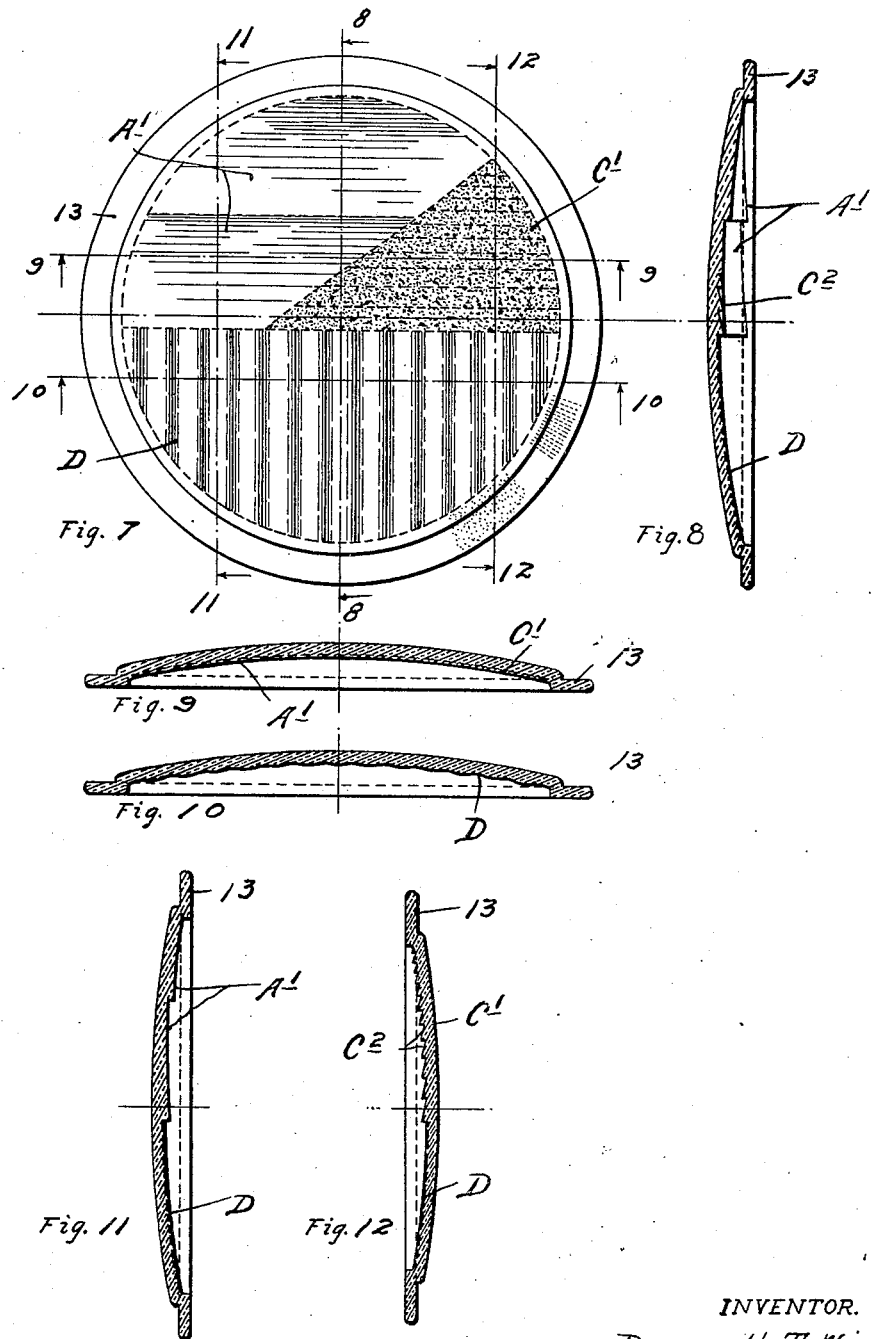

Patented Feb. 27, 1923.

1,446,607

UNITED STATES PATENT OFFICE.

RUSSELL T. WING, OF ST. CLOUD, MINNESOTA, ASSIGNOR TO WING CORPORATION, OF MINNEAPOLIS, MINNESOTA, A CORPORATION OF DELAWARE.

LENS FOR HEADLIGHTS.

Application filed October 21, 1920. Serial No. 418,512.

*To all whom it may concern:*

Be it known that I, RUSSELL T. WING, a citizen of the United States, residing at St. Cloud, in the county of Stearns and State of Minnesota, have invented certain new and useful Improvements in Lenses for Headlights; and I do hereby declare the following to be a full, clear, and exact description of the invention, such as will enable others skilled in the art to which it appertains to make and use the same.

My present invention relates to headlight lenses for automobiles and other road vehicles and accomplishes, in an improved way and by an improved means and in a more satisfactory manner, the general objects of the inventions disclosed in my pending applications, entitled "Headlights", the one filed of date March 22, 1920, under Serial Number 367,733, and the other filed of date March 11, 1920, under Serial Number 365,115.

Generally stated, the object of the prior inventions and the present invention is good road illumination with a non-blinding light beam, that is, with a light beam that will not produce blinding effects to the eyes of persons in approaching machines, but will project a large amount of light onto the road and a defused light above and ahead of the machine to illuminate overhead objects.

The present invention carries the above object to greater perfection by dimming or eclipsing considerably less than one quadrant of the upper half of the headlight lens and by downwardly deflecting a considerable portion of the remaining part of the upper half of the light beam, so that it will reach the road ahead of the machine. Thus, a part of the upper half of the light beam, including both direct and reflected rays, will be dimmed, but the greater part of the upper half of said light beam will be downwardly deflected; and both of these results prevent blinding effects of the light beam. The present invention, as preferably carried out, involves also other important features, as will hereinafter appear.

In the accompanying drawings, which illustrate the invention, like characters indicate like parts throughout the several views.

Referring to the drawings:

Fig. 1 is a front elevation showing the improved lens as preferably designed;

Figs. 2, 3, 4, 5 and 6 are sections taken, respectively, on the lines 2—2, 3—3, 4—4, 5—5 and 6—6 of Fig. 1;

Fig. 7 is a view corresponding to Fig. 1, but illustrating a modified form of the lens; and Figs. 8, 9, 10, 11 and 12 are sections taken, respectively, on the lines 8—8, 9—9, 10—10, 11—11 and 12—12 of Fig. 7.

The preferred form of the lens illustrated in Figs. 1 to 6, inclusive will first be described.

The lens 13, as illustrated and as preferably constructed, is made concavo convex in form with a smooth convex exterior surface, the various prismatic and otherwise formed zones thereof being on the concave interior of the lens.

In this improved lens, the upper and lower halves thereof are very differently constructed so as to have very different functions or effects on the light beam that will be projected therethrough from the headlight to which the lens will be applied in the customary or any suitable way. The so-called lower half of the lens, marked D on Fig. 1, is below a horizontal line $y$—$y$ that substantially intersects the axis of the center of the lens, and the so-called upper half of the lens is all or substantially all above such horizontal line. The lower half zone D, in some instances, may be left smooth and clear, but, preferably, it is formed with a corrugated or vertically ribbed inner surface, so that the light rays passed through this lower half section or zone will be defused and spread in a horizontal direction on the road ahead of the machine.

In the most approved form of the lens, the upper zone or half section thereof is subdivided into zones A, B, C and B¹. The zone C is a curved segment that extends inward from the rim portion of the lens, substantially radially inward but past the center of the lens. Moreover, this zone or segment C, as it approaches the rim of the lens, rises above the horizontal axial or dividing line $y$—$y$ so as to lift the small radial zone B¹. The zone B is a curved segment located between the zone or segment C and the zone or segment A.

The segmental zone B (note particularly Figs. 1 and 2) is formed with a plurality, as shown two, horizontally extended prismatic portions that are arranged to deflect, downward and onto the road, all of the direct and reflected rays that are projected therethrough.

The zone B¹ may be treated as a separated continuation of the lower prism of the zone B, and, hence, light rays passed through this zone B¹ will also be deflected onto the road. The zone C, above described, in some instances, might be opaque, but, preferably, is translucent, being either ground-frosted or tinted so as to positively intercept all blinding rays.

The zone A is of a peculiar formation and is divided into prismatic sub-sections separated at $y^1$ on Fig. 1. The two subdivisions of said zone A are different prismatic surfaces, which, in a horizontal direction, (see particularly Fig. 3), are beveled in a direction to cause light rays, passed therethrough, to be spread and deflected horizontally toward the inner side of the road. In vertical cross section (see Fig. 5), the prisms of said zone A are of wave like form so that the light rays passed therethrough will be spread vertically, thereby causing some thereof to reach the road and some to be diffused above the road ahead of the machine so as to illuminate overhead objects, such as might do damage to the machine.

The zone C, as noted, is a light-intercepting zone, while the other zones or prismatic surfaces may be and preferably are clear glass. Nevertheless, said light-intercepting zone C might also be prismatic and, as said zone C would be made to somewhat approach transparency, the prismatic surfaces thereof should be arranged to deflect the light rays at least slightly downward.

The lens described should be applied to the headlight in such a manner that its left-hand side, Fig. 1, (the right-hand side in respect to the driver) would be toward that side of the road nearest to which, in accordance with the rules of the road, the automobile or vehicle should travel, and the right-hand side of the lens, as shown in Fig. 1, should be toward the center of the road.

When this improved lens, just described, is applied as above stated, it will function as follows:

The direct and reflected rays that are projected through the lower half D of the lens will reach the ground ahead of the machine. The direct and reflected rays that would produce blinding in the eyes of the driver of an approaching machine are intercepted by the opaque or translucent zone C. The reflected rays passed through the zones B and B¹ will be deflected onto the ground ahead of the machine. The prisms A cause the light to pass therethrough to spread vertically and to be deflected horizontally toward the near side of the road.

The lower half of the light beam, as above stated, will, with the corrugated lower half section, be diffused and spread laterally upon the road ahead of the machine. This causes an ideal road illumination. It intercepts or eclipses only a comparatively small part of the light beam, in order to prevent blinding, and disposes of the clear part of the beam in such a manner that it will properly illuminate the road and other objects along the line of travel without producing blinding effects upon the eyes of persons in approaching machines. Thus, the objects of the invention are accomplished so far as non-blinding is concerned, and a maximum road-lighting efficiency is also accomplished.

It may be further noted that with the lens above described, the light rays are eclipsed or made dim in considerably less than a quadrant or 90 degrees of the lens (preferably less than 45 degrees) and thus, the greater part of the lens may be left clear, so that the light rays are passed freely therethrough but will be deflected thereby substantially as above stated.

In the modified form of the lens shown in Figs. 7 to 12, inclusive, the lower half of the lens is preferably constructed in the same manner as the lower half of the lens above described in detail. The upper half of the lens, however, is divided into two zones A¹ and C¹. The zone C¹, as preferably constructed, is colored green or orange or lightly sanded or frosted so that it will pass considerable light but will intercept blinding rays, and, at the rim of the lens, it extends approximately 90 degrees from the horizontal dividing line between the upper and lower approximate half sections of the lens, and, at its converging inner portion, it crosses a vertical line drawn through the axis of the lens. Thus, this zone C¹ will intercept direct and reflected rays that would otherwise produce the most blinding effects in the eyes of persons in approaching machines. Moreover, as preferably constructed, this zone C¹, on its inner surface, is formed with small horizontal prisms C² (see Figs. 7, 8 and 12) that tend to produce a downward deflection of such light rays as are passed through said zone C¹.

The zone A¹, as preferably constructed, is provided on its inner side with two large horizontally extended prisms or prismatic surfaces (see particularly Figs. 7, 8 and 11), both of which produce downward deflection of the light rays that pass therethrough and thus throw such rays onto the road ahead of the machine where they will produce good road illumination without producing blinding effects in the eyes of persons in approaching machines.

Both lenses illustrated are concavo convex in general form, but the features of construction described may, of course, be applied to approximately flat lenses, although the best results are accomplished by the use of the concavo convex lenses, which give a wider range of light defusion.

In both form of the lens, as illustrated, all of the lower part of the light beam and a greater part of the upper part of the half section of the light beam will reach the ground ahead of the machine, thereby giving the best possible road illumination. A small part of the upper portion of the beam will be diffused and less than half of the upper part of the light beam will be intercepted or dimmed to prevent blinding effects.

The purpose of curving the edges of the segmental light-intercepting zone in a direction outwardly and upwardly is as follows: A person in a car, at quite a distance from the oncoming car, may look at the headlight directly in front thereof and, at such time, the filament will be cut out of direct vision by the converging inner portion of such intercepting zone. As the cars more closely approach, each turns out of line of the travel of the other and the line of vision to the filament raises or increases its angle in respect to a horizontal, and this requires increasing rise in the intersecting zone, such as afforded by the curving of the outwardly converging edges thereof. Also, as the machines approach, greater vertical extension of the intercepting zone is highly desirable and this also is afforded by the arrangement described.

What I claim is:

1. A headlight lens having in its upper portion a light-intercepting zone extended at one side through materially less than 90 degrees, the main upper zone of said lens being prismatic and its prisms being constructed and arranged to produce a downward deflection of the light rays passed therethrough, the lower part of said lens being formed with vertical corrugations or wave-like surfaces that spread laterally the light rays passed therethrough.

2. A headlight lens having in its upper portion a light-intercepting zone extended at one side through materially less than 90 degrees, the main upper zone of said lens being prismatic and its prisms being constructed and arranged to produce a downward deflection of the light rays passed therethrough, said light-intercepting zone having its greatest circumferential width near the rim of the lens and converging inwardly and extended to a point on the opposite side of the center of said lens.

3. A headlight lens having in its upper portion a light-intercepting zone extended at one side thereof through materially less than 90 degrees, the main upper zone of said lens being formed with two classes of prisms, the inner of which prisms are constructed and arranged to deflect light rays downward and the outer of which are constructed and arranged to deflect light rays laterally outward.

4. A headlight lens having in its upper portion a light-intercepting zone extended at one side thereof through materially less than 90 degrees, the main upper zone of said lens being formed with two classes of prisms, the inner of which prisms are constructed and arranged to deflect light rays downward and the outer of which are constructed and arranged to deflect light rays laterally outward and both upwardly and downwardly.

5. A headlight lens having in its upper portion a light-intercepting zone extended at one side through materially less than 90 degrees, the main upper zone of said lens being prismatic and constructed and arranged to produce a downward deflection of the light rays passed therethrough, said light-intercepting zone having curved outwardly and upwardly diverging edge portions.

6. A headlight lens having in its upper portion a light-intercepting zone extended at one side through materially less than 90 degrees, the main upper zone of said lens being prismatic and constructed and arranged to produce a downward deflection of the light rays passed therethrough, said light-intercepting zone having curved outwardly and upwardly edge portions, the lower of which rises above a horizontal line that intersects the axis of the lens, leaving a small outwardly radiating zone above said line, said latter zone being prismatic and arranged to produce a downward deflection of light.

In testimony whereof I affix my signature.

RUSSELL T. WING.